May 20, 1969 C. H. THOMAS 3,445,773
TRANSPORT TIME DELAY UNIT
Filed May 6, 1966
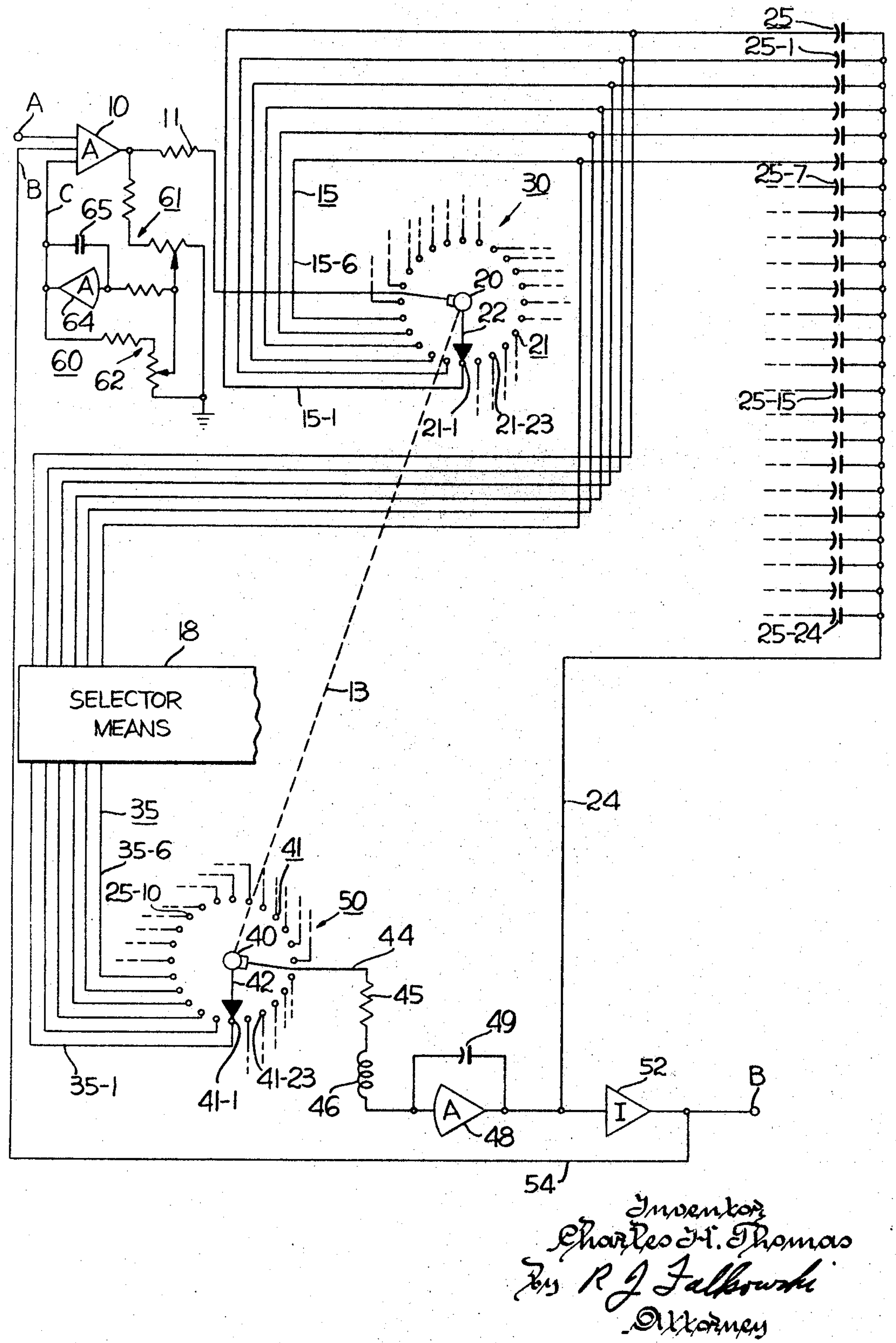
Inventor
Charles H. Thomas
By R J Falkowski
Attorney United States Patent Office 3,445,773

Patented May 20, 1969

3,445,773

TRANSPORT TIME DELAY UNIT

Charles H. Thomas, Brookfield, Wis., assignor to Allis-Chalmers Manufacturing Company, Milwaukee, Wis.

Filed May 6, 1966, Ser. No. 548,304
Int. Cl. H03k *21/08, 27/00*
U.S. Cl. 328—121 7 Claims

ABSTRACT OF THE DISCLOSURE

A transport time delay device for analog computer applications produces an output signal which is a selectively delayed reproduction of an input signal and has a summing amplifier which receives the input signal, rotary switch means for incrementally sampling the output signal from the summing amplifier and storing the samples upon a plurality of capacitors in a predetermined sequence, an integrating amplifier, rotary read-out switch means for transferring the samples after a predetermined time delay to the integrating amplifier in said predetermined sequence, and inverting amplifier means for providing a negative feedback second input signal to the summing amplifier to permit the capacitors to be charged only to the potential of the input signal.

This invention relates to transport time delay means, particularly to transport time delay devices capable of providing time delay inputs to analog computers.

A delay device according to the invention can be used in many ways to study time delay effects. It is particularly suited for use as a general transport time delay unit for analog computer applications. A typical transport time delay unit according to this invention can provide an analog computer input simulating the traveling wave phenomenon occurring on a three phase transmission line, and thereby enable accurate study of relatively complex electrical power switching problems.

Prior to this invention, time delay studies using computers required a utilization of a significant portion of the computer components which reduced effective computer size; the utilization of mathematical approximations which produced inaccurate representations; or the utilization of relatively expensive magnetic tape recording equipment.

In accordance with this invention, means are provided that produce a circuit output signal that is substantially a selectively delayed reproduction of an input signal. This is accomplished by providing means for connecting a plurality of storage devices to sequentially receive and store an increment portion of the input signal. Means are also provided for connecting the storage devices in the same sequence after the selected time delay to provide a measure of the increment portions thereby essentially reproducing the delayed input signal.

The advantages of this invention are that high computer accuracy is easily obtained if desired; the cost is relatively low; space requirements are relatively small; the device is simple in construction; and the life of operation of the device is relatively long.

The objects of this invention are to provide a new and improved transport time delay device; to provide a transport time delay device providing any desired degree of accuracy; and to provide a transport time delay device simple in construction and relatively low in cost.

The figure is a schematic drawing of a transport time delay device embodying the invention.

Referring to the figure, a signal of desired characteristics, for example, indicating current-voltage relationships, is applied as an input A to summing circuit 10. The summing circuit is preferably an operational amplifier that provides an output equal in magnitude to the sum of its inputs.

The output of summing circuit 10 is applied across a resistor 11 to a center terminal 20 of a rotary switch 30 having an arm 22 and any desired number of peripheral terminals 21, numbered 21–1 through 21–24. Each of the terminals is respectively connected along conductors 15, numbered 15–1 through 15–24, to storage devices, such as capacitors 25, numbered 25–1 through 25–24. For example, terminal 21–1 and line 15–1 are connected to capacitor 25–1. All the capacitors have one plate connected to a common conductor 24 and each capacitor has another plate connected to conductors 15–1 to 15–24, respectively.

Selector means are provided to connect conductors 15–1 to 15–24 to another set of conductors 35, numbered 35–1 through 35–24, in a selectable sequence. Selector means 18 can be any known multiple pole switching device that can selectively connect conductor 15–1 to any of the conductors 35–1 to 35–24 and thereby also connect the remaining conductors in sequence such as 15–2 to 35–3, 15–3 to 35–4, etc.

Conductors 35 are connected to peripheral terminals 41, numbered 41–1 through 41–24, of a rotary switch 50 having a center terminal 40 and an arm 42. Peripheral terminals 41–1 through 41–24 are connected to conductors 35–1 to 35–24, respectively.

Switches 30 and 50 are mounted on a common shaft, shown schematically as dashed line 13, and are synchronously rotated at a selected speed by any known means (not shown). During operation, one of the peripheral terminals is momentarily connected through arm 22 of rotary switch 30 to charge a corresponding capacitor 25 according to the input level as the instant arm 22 connects with the respective terminal 21. By adjustment of selector means 18, the relative position of arm 42 of rotary switch 50 relative to arm 22 is selected so that a charge placed on a capacitor 25 by the rotation of arm 22 is transferred at some point later in the rotation of the rotary switches by arm 42 to provide the measure of the potential of the incremental portions of the reproduced input. For example, if line 21–1 is connected by selector means 18 to line 41–2 and arms 22 and 42 are mounted at the same angle on the shaft, the potential placed on capacitor 25–1 is transferred by switch 50 one twenty-fourth of a revolution later, when arm 42 contacts terminal 41–2.

The capacitor that is currently connected to center terminal 40 is connected along a conductor 44 through a resistor 45 and a series inductor 46 to a holding or integrating amplifier 48 having a small capacitance 49 connected between its input and output terminals. Capacitance 49 provides for holding of the potential placed across it by the sequential connections through rotating switch 50 to capacitors 25.

Inductor 46 is an optional component but should be incorporated if holding amplifier 48 is a transistorized amplifier. The size of inductor 46 and resistor 45 are selected to provide near critically damped response. The inductor should be magnetically shielded and functions to limit the time rate of change of current to the input of amplifier 48.

The common connection side of capacitors 25 is connected to the output terminal of amplifier 48 to produce an output at a terminal B through an inverting amplifier 52. The inverted output of the inverting amplifier provides negative feedback along a conductor 54 to provide a second input to summer 10. The feedback assures that each capacitor 25 is charged only to the potential of the input signal A and also cancels any drift that may occur in inverter 54.

Means may also be provide to eliminate offset voltages that may occur in the output in amplifier 48 by the utilization of an offset correction circuit 60. The offset correction circuit comprises a series connected resistor-potentiometer circuit 61 and a series connected resistor-potentiometer circuit 62 connected to provide a measure of the output of amplifier 10. A low gain integrating amplifier 64 is connected in parallel with a capacitor 65 and receives a signal from the balance potential selected by the taps of resistor-potentiometer circuits 61 and 62.

In addition to eliminating the offset voltages occurring, the correction circuit shown also removes any rectified offset voltage that could be picked up from the power source when an alternating voltage at a critical frequency is present, and it also removes any initial voltage or offset inherent in amplifier 64.

The output labedel C, of amplifier 64 changes very slowly because of the low gain of the amplifier. The desired voltage offsets are removed by integration of the output of summing circuit 10. The additional input C to summing circuit 10 provides the required correction and the passage of normal problem signals through the delay unit occurs without interference.

In the operation of the device, a simulated signal having desired characteristic is applied as input A to summer 10. Negative feedback, input B, is supplied along conductor 54 to summer 10 and, if used, offset voltage correction circuit 60 provides a third input C. The resultant output is applied across resistor 11 to rotary switch 30. The arms 22 and 42 of rotary switches 30 and 50, respectively, are rotated by shaft 13 at a speed selected to obtain desired results. The rotation of arm 22 of switch 30 provides incremental sampling of the voltage appearing as input A and allows storage of the samples on successive capacitors 25-1 through 25-24. These capacitors hold the consecutive samples of input A and the relative angular position of arms 22 and 42 allows transfer of such samples after a selected time delay to holding amplifier 48.

The delay in the embodiment shown can be from one twenty-fourth to twenty-three twenty-fourths of the period of time of one revolution of switches 30 and 50. However, switches 30 and 50 can have any number of contacts depending on the internal sampling accuracy required for a particular application. In the presence of a source frequency of 60 cycles per second, as is common, it is desirable that the number of contact points, N, on the rotating switch is selected in accordance with the relationship:

$$N=\frac{120}{2M-1}\cdot\frac{1}{\text{r.p.s.}}$$

where M is an integer and the r.p.s. indicates the revolutions per second of the rotating switches. This selection eliminates any tendency to rectify 60 cycle pick-up assuming that the width and spacing of the contacts are geometrically perfect.

In the particular application to electrical transmission line problems, one basic relationship for time scaling is employed. This is:

$$\frac{HS}{c}=\left(\frac{M}{N}+\frac{1}{2N}-\frac{f}{N}\right)\frac{1}{\text{r.p.s.}}+T_c$$

where N is the total number of positions in each switch, M is an integer (starting with unity) equal to the number of positions advanced by selector 18, H is equal to the length of the transmission line being evaluated expressed in miles, *c* is the velocity of wave propagation in miles per second, S is the time scale change which must be employed in the computer problem. The term $1/2N$ is a very small correction added considering the fact that the output of amplifier 48 is a delayed jump function of the input A. The term $(-f/N)$ is a small correction subtracted in order to account for the finite angular space occupied by a given contact on the rotating switches. In this expression $f$ is the fraction angular space occupied by a contact in comparison to the angular space between similar points on adjacent contacts. The term $T_c$ is included to allow accounting for the very small delay introduced by the charging time constant through resistor 11 to capacitors 25. For example, if the switch arms rotate at a speed equal to 60 revoltuions per minute (1.0 r.p.s.), the propagation velocity is equal to about 186,400 miles per second, the contacts occupy 2/3 of the angular space, and the number of contacts is twenty-four ($N=24$), then:

$$HS=186{,}400\left(\frac{M}{24}+\frac{1}{48}-\frac{1}{36}+T_c\right)$$

If the charging time constant $T_c$ is equal to $1/720$ second, which is adequate for assuring proper functioning, then:

$$HS=186{,}400\left(\frac{M}{24}-\frac{1}{180}\right)$$

In application, the position M of selector 18 and the time scale change S are selected as appropriate for the particular length of transmission line H being studied.

In cases where the transmission line is energized by a source having a frequency of 60 cycles per second, a second basic relationship is:

$$\Delta\Theta=\frac{21{,}600}{N(\text{r.p.s.})S}$$

where $\Delta\Theta$ is the number of degrees of a 60 cycle wave encompassed by consecutive positions of the rotating switches.

In order to practically eliminate the effects of the increment or jump function resulting from the discharge of the capacitors, the function $\Delta\Theta$ should be made relatively small. For example, if the number of positions is equal to thirty, good representation is achieved for line lengths under 200 miles. If the line being evaluated is shorter, the accuracy of representation is greater. On the other hand, greater lengths can be simulated and valid problem solutions can still be achieved but the accuracy is somewhat restricted because of the larger incremental steps.

In general, the greater the number of positions provided in the switch, the greater is the flexibility allowed in computer problem applications. Cascading of the delay components may be resorted to if longer transport delay time is desired. For a given speed of arm rotation, however, it is preferable to provide a greater number of positions because this permits smaller changes in the line lengths considered.

In describing the invention, the preferred embodiment has been shown and described, but it is obvious to one skilled in the art that there are many variations, combinations, alterations and modifications that may be made without departing from the spirit of the invention or from the scope of the appended claims.

The embodiments of the invention in which an exclusive property or privilege is claimed are defined as follows:

1. Transport time delay means for producing a circuit output signal substantially reproducing a circuit input signal after a preselected time delay, said means comprising:

a plurality of storage devices for storing electrical energy at a level varying as a function of electrical energy received;

a summing amplifier adapted to receive several input signals and to provide an output signal which is a function of the sum of its input signals;

first means including said summing amplifier connected to receive said circuit input signal as an input for connecting the storage devices to receive in a preselected sequence a measure of an incremental portion of said circuit input signal; and second means for connecting the storage devices to provide a circuit output signal made up of a measure of the portions in the preselected sequence after the preselected time delay and including means connected to receive the measure of the portions for inverting said portions to produce an inverted signal and connected to deliver the inverted signal as a negative feedback second input to the summing amplifier.

2. Transport time delay means according to claim 1 wherein said second means comprises:

switching means for sequentially connecting the storage devices in the preselected sequence, and an integrating amplifier connected to integrate and amplify the sequential portions of the measures of the energy stored by the storage devices.

3. Transport time delay means according to claim 2 also comprising means for correcting the offset voltage of the integrating amplifier comprising impedance means connected to provide a measure of the output signal of the summing amplifier and a low gain integrating amplifier having an input terminal connected to receive said measure and an output terminal connected to provide a third input to the summing amplifier.

4. Transport time delay means for producing a circuit output signal substantially reproducing a circuit input after a predetermined time delay; said means comprising:

a sampling switch having a plurality of stationary contacts arranged in a circle and a rotatable contact adapted to sequentially engage said stationary contacts;

a plurality of capacitors each of which is coupled to one of said stationary contacts;

means for coupling said circuit input signal to said rotatable contact;

a rotary switch having the same number of stationary contacts as said sampling switch arranged in a circle and a rotatable contact adapted to sequentially engage said stationary contacts;

means for synchronously rotating said rotatable contacts of said sampling and rotary switches;

an integrating amplifier coupled to said rotatable contact of said rotary switch; and selector means including said rotary switch for sequentially transferring the charges on said capacitors to said integrating amplifier after said predetermined time delay, said selector means also including means for selectively connecting said stationary contacts of said sampling switch to succeeding stationary contacts of said rotary switch.

5. Transport time delay means according to claim 4 and including a summing amplifier adapted to receive a plurality of input signals and provide an output which is a function of the sum of said input signals and being connected to receive said circuit input signal as an input, and means including an inverting amplifier connected to the output of said integrating amplifier for providing a negative feedback second input signal to said summing amplifier.

6. Transport time delay means according to claim 5 also comprising means for correcting the offset voltage of the integrating amplifier comprising impedance means connected to provide a measure of the output signal of the summing amplifier and a low gain amplifier having an input terminal connected to receive said measure and an output terminal connected to provide a third input to the summing amplifier.

7. Transport time delay means for producing a circuit output signal substantially reproducing a circuit input signal after a selected time delay, said means comprising:

a summing amplifier of the type adapted to receive several input signals and produce an output having a magnitude equal to the sum of its inputs, said summing amplifier connected to receive the circuit input signal as one of its inputs;

a first and second rotary switch each having a center terminal, several peripheral terminals, and an arm connected to said center terminal and constructed to sequentially connect the center terminal to the peripheral terminals upon rotation of the arm;

means for synchronously rotating the arms of the rotary switches;

means for connecting the center terminal of the first rotary switch to receive the summing amplifier output;

several capacitors each having a first and second plate with all of said first plates connected to a common point;

means for connecting each of the second plates to a different peripheral terminal of the first rotary switch;

selector means for connecting each of the second plates of the capacitors to a different peripheral terminal of the second rotary switch, said selector means adjustable to connect any capacitor to any peripheral terminal and to sequentially connect the remaining capacitors to the peripheral terminals;

an integrating amplifier having an input terminal connected to the center terminal of the second rotary switch and an output terminal providing an integrated output connected to the capacitor common point;

an inverting amplifier connected to receive the integrated output as an input and producing the circuit output signal at an output terminal with said output terminal connected to deliver the circuit output signal to the summing amplifier as a second, negative feedback input; and means for correcting the offset voltage of the integrating amplifier comprising impedance means connected to provide a measure of the output of the summing amplifier and a low gain amplifier having an input terminal connected to receive said measure and an output terminal connected to provide a third input to the summing amplifier.

References Cited

UNITED STATES PATENTS 2,966,641 12/1960 McCoy ------------- 333—29

ARTHUR GAUSS, *Primary Examiner.*

B. P. DAVIS, *Assistant Examiner.*

U.S. Cl. X.R.

328—151; 333—29

UNITED STATES PATENT OFFICE

CERTIFICATE OF CORRECTION

Patent No. 3,445,773 May 20, 1969

Charles H. Thomas

It is certified that error appears in the above identified patent and that said Letters Patent are hereby corrected as shown below:

Column 5, line 2, after "input" insert -- signal --.

Signed and sealed this 14th day of April 1970.

(SEAL)
Attest:

Edward M. Fletcher, Jr.
Attesting Officer

WILLIAM E. SCHUYLER, JR.
Commissioner of Patents